(No Model.) 2 Sheets—Sheet 2.

W. C. BRAMWELL.
MECHANISM FOR SUPPLYING FIBROUS MATERIAL TO PICKERS, &c.

No. 464,551. Patented Dec. 8, 1891.

Witnesses.
Fred S. Greenleaf
Edward F. Allen

Inventor.
William C. Bramwell,
by Crosby & Gregory
Attys.

UNITED STATES PATENT OFFICE.

WILLIAM C. BRAMWELL, OF HYDE PARK, MASSACHUSETTS.

MECHANISM FOR SUPPLYING FIBROUS MATERIAL TO PICKERS, &c.

SPECIFICATION forming part of Letters Patent No. 464,551, dated December 8, 1891.

Application filed September 1, 1891. Serial No. 404,391. (No model.)

*To all whom it may concern:*

Be it known that I, WILLIAM C. BRAMWELL, of Hyde Park, county of Norfolk, State of Massachusetts, have invented an Improvement in Mechanism for Supplying Fibrous Material to Pickers, &c., of which the following description, in connection with the accompanying drawings, is a specification, like letters on the drawings representing like parts.

Machines used for picking, opening, and preparing cotton for carding and like processes preparatory to spinning have feeding-aprons on which the cotton is uniformly spread by hand, feed-rolls running at a comparatively slow speed and co-operating therewith, taking the cotton from the feeding-apron and delivering it to the beater or cylinder, which is run at a high speed, the feed and beater being so connected and driven that they may be stopped instantly, whenever desired, without shock or jar to the picker or cylinder, the latter continuing to run.

Some machines, especially those for treating wool, have been provided with automatic feeding mechanism to supply the feed-apron thereof automatically with the proper quantity of wool; but in such feeding-machines the doffer, stripper, and toothed lifting device or belt used have been so combined and made dependent one on the other that they have been stopped and started together.

In my attempts to automatically supply cotton to the feeding-apron of a cotton picker or opener I have discovered that the feeder to be practical must have its lifting device actuated independently of the doffer and stripper, and the said lifter and feed-rolls of the picker must be adapted to be stopped and started in unison and independently of the other parts of the feeder and picker.

In the most approved form of my invention I employ a feed-shaft and clutch mechanism, so that the opening or closing of the said clutch enables the feed-rolls and lifting device of the feeder to be stopped and started at will.

I prefer to actuate the feed-shaft from the beater-shaft of the picker or opener, but it is immaterial in this invention from what shaft the said feed-shaft derives its rotation.

Figure 1:
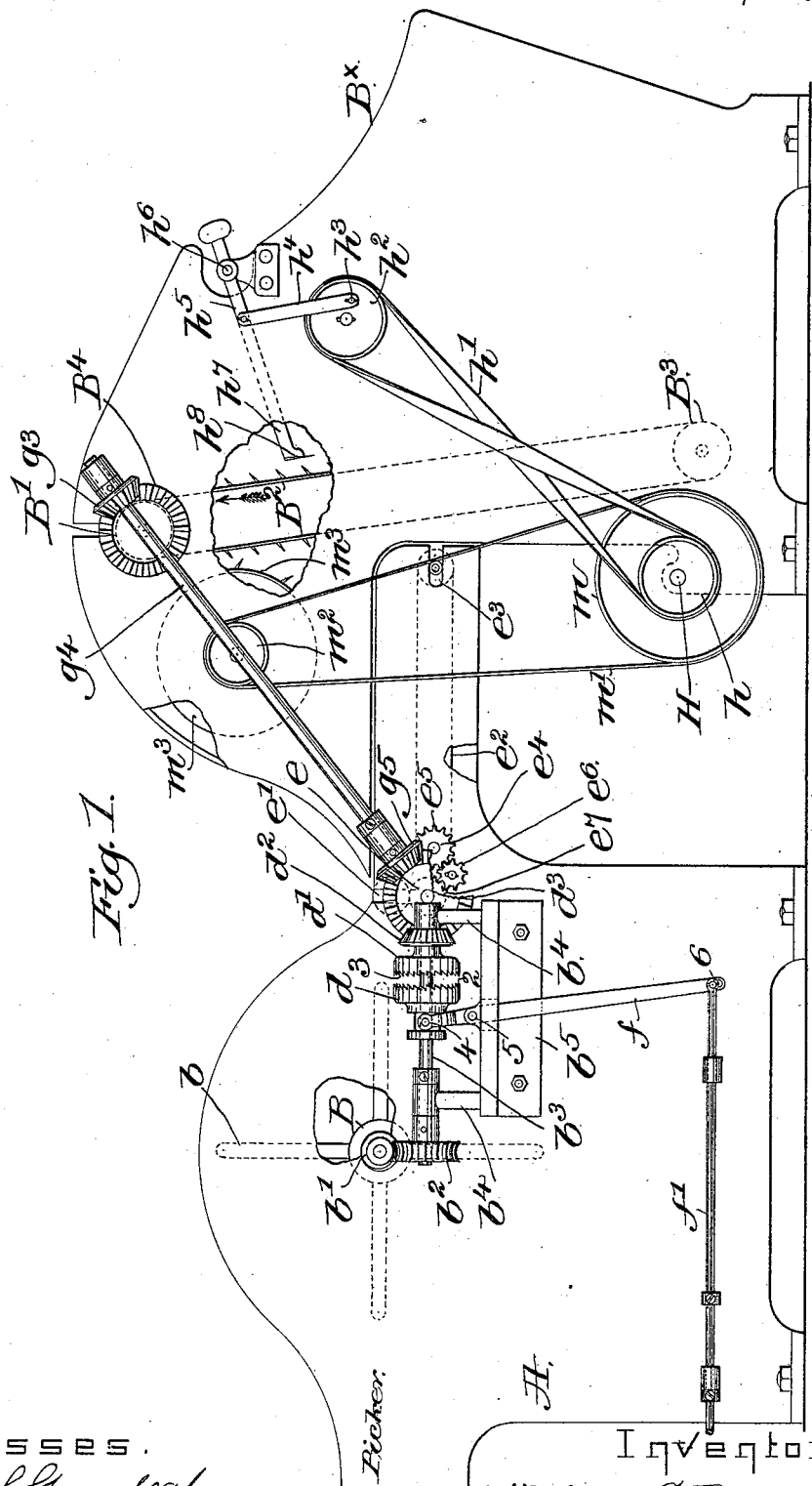
Figure 2:
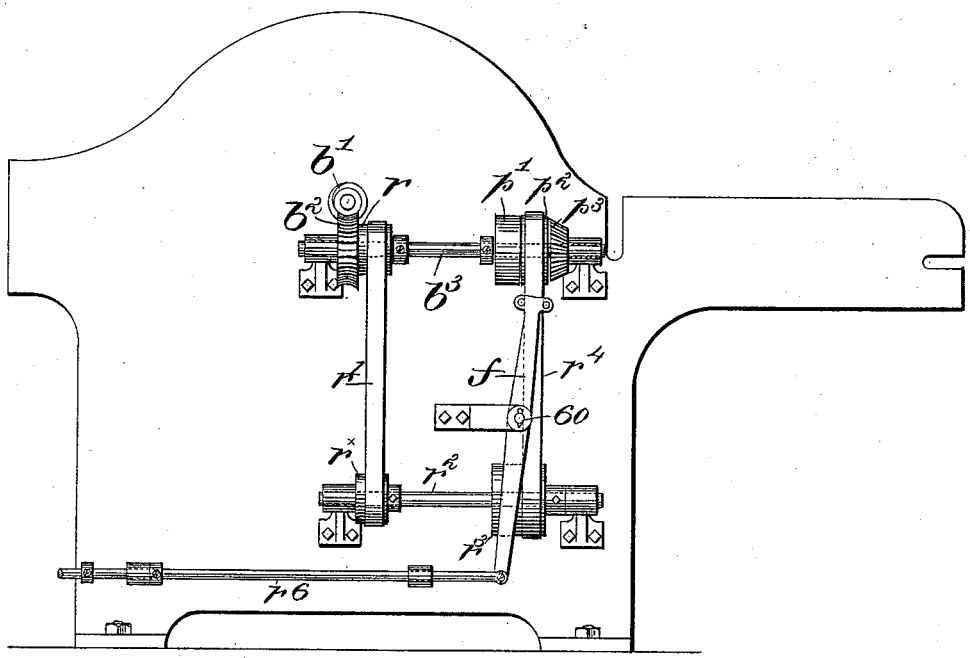

Figure 1 in side elevation shows a picker or opener and a feeder therefor embodying my invention; Fig. 2, a modification to be referred to.

The frame-work A and beater B, having arms $b$, are and may be of any usual or suitable shape common to pickers or openers employed in connection with cotton. The beater-shaft in practice will be run at high speed from some suitable counter-shaft, the feed-rolls $e\ e'$, the feed-apron $e^2$, extended over suitable rolls, one of which is designated by $e^3$, the other of corresponding size at the opposite end of the apron being on a shaft $e^4$. The gear $e^5$, driven from an intermediate $e^6$, engaged and driven by a gear $e^7$, fast on the shaft of the under feed-roll $e$, are and may be all as usual in pickers and openers.

The feeder at the right in Fig. 1 has a receptacle $B^\times$ for the cotton which is to be supplied to the picker. Inside this receptacle is a shaft $B'$, over which is extended the toothed lifting device $B^2$. (Shown as a toothed belt extended about a roller $B^3$ near the bottom of the said receptacle and designated by dotted lines.) The shaft $B'$ has a bevel-gear $B^4$. The rotation of the shaft $B'$ causes the lifting device to travel in the direction of the arrow near it in Fig. 1, and the teeth thereon lift the cotton, the comb $h^8$ detaching any surplus material therefrom. The cotton carried over the shaft $B'$ is removed from the lifting device by the rotating stripper $m^3$. The feeder frame-work has a power-shaft H, provided with two pulleys $h\ m$. The pulley $h$ by the belt $h'$ rotates the disk $h^2$, having a crank-pin $h^3$, which by link $h^4$, connected with an arm $h^5$ of the rock-shaft $h^4$, actuates the comb-carrier $h^7$. The pulley $m$ by belt $m'$ over the drum $m^2$ rotates the stripper $m^3$, the comb and stripper being run at a high speed and independently, entirely so, of the lifting device.

The gist of this invention is to make the movement of the feed-rolls of the picker or opener and the movement of the lifting device of the feeder dependent one on the other, and to enable them to be stopped or started together at will, while the other parts of the apparatus continue to be run at speed. To do this, I prefer for the greatest simplicity to provide the beater-shaft with a worm $b'$, which engages a worm-gear $b^2$ and rotates a feed-shaft $b^3$, on which is splined to slide a clutch part $d$, under the control of a lever $f$, pivoted at 5, and having one end forked and provided with a roller or other stud to enter an annular groove of the hub of the said clutch part, the opposite end of the said lever being herein represented as jointed to a shipper-rod $f'$. This feed-shaft, which is supposed to be rotated continuously from the picker-shaft or some other rotating part of the machine, has loose on it a clutch part $d'$, provided with a bevel-gear $d^2$, which engages the bevel-gear $d^3$ on, as herein shown, the lowermost feed-roll shaft $e$.

The clutch parts $d$ and $d'$ are represented of that kind which are provided with teeth at their faces to enable one to engage and rotate the other, as desired; but instead I may employ any other usual clutch device. The bevel-gear $d^3$ on the feed-roll $e$ engages a bevel-pinion $g^5$ on the intermediate shaft $g^4$, having at its opposite end a second bevel-pinion $g^3$, which engages the bevel-gear $B^4$, before referred to, fast on the roller $b'$.

From the foregoing it will be obvious that when the clutch parts $d$ and $d'$ on the feed-shaft $b^3$ are engaged the feeding-rolls $e\ e'$ and the lifting device $B^2$ will be moved, and that when disengaged the said parts will remain at rest and yet let the picker, the stripper, and the comb run at high speed.

Believing myself to be the first to engage the lifting-apron of a feeder and the feed-rolls of a picker or opener so that they may be driven in unison while other parts of the feeder and picker or opener run at speed, this invention is not limited to the exact mechanical means or gearing shown for effecting the coupling together and operation in unison of the said lifting device and feed-rolls.

While I prefer to use a clutch, as shown, on the feed-shaft, yet I desire to state as an equivalent I might provide the feed-shaft $b^3$ with a worm-wheel loose thereon, as in Fig. 2, and attach to one side the said worm-wheel a belt-pulley $r$, and also provide the said shaft with a loose pulley $p'$ and a second loose pulley $p^2$, having an attached bevel-gear $p^3$, the same as $b^2$, Fig. 1, to engage the bevel-gear $e'$. The pulley $r$ by belt $r'$ on the pulley $r$ will rotate shaft $r^2$, having a broad pulley $r^3$, which by belt $r^4$ will rotate either of the two pulleys $p'$ or $p^2$. The belt $r'$ will be controlled by suitable belt-shipper $f'$, represented as pivoted at 60 and connected to shipper-rod $r^6$.

Having described my invention, what I claim as new, and desire to secure by Letters Patent, is—

1. In a machine for treating fibrous material, the following instrumentalities, viz: a picker-cylinder, picker feed-rolls, a toothed lifter forming part of a feeder, a stripper for said lifting device, a continuously-rotating feed-shaft, gearing intermediate and connecting the said lifting device and the said feed-rolls, and a detachable connection intermediate said feed-shaft and feed-rolls, whereby the said feed-rolls and lifting device may be stopped independently of the picker and stripper, to operate substantially as described.

2. In a machine for treating fibrous material, the following instrumentalities, viz: a picker-cylinder, picker feed-rolls, a toothed lifter forming part of a feeder, a vibrating comb co-operating with said lifting device, a continuously-rotating feed-shaft, gearing intermediate and connecting the said lifting device and the said feed-rolls, and a detachable connection intermediate said feed-shaft and feed-rolls, whereby the said feed-rolls and lifting device may be stopped independently of the picker and vibrating comb, to operate substantially as described.

3. In a machine for treating fibrous material, the following instrumentalities, viz: a picker-cylinder, picker feed-rolls, a toothed lifter forming part of a cylinder, connections between said rolls and lifter, a stripper for said lifter, a vibrating comb co-operating with said lifting device and the said feed-rolls, a continuously-rotating shaft, and a detachable connection between said shaft and the connections between the feed-rolls and lifter, whereby the said feed-rolls and lifting device may be stopped independently of the picker, stripper, and vibrating comb, to operate substantially as described.

In testimony whereof I have signed my name to this specification in the presence of two subscribing witnesses.

WILLIAM C. BRAMWELL.

Witnesses:
G. W. GREGORY,
EMMA J. BENNETT.